Figures 1, 2, 3:
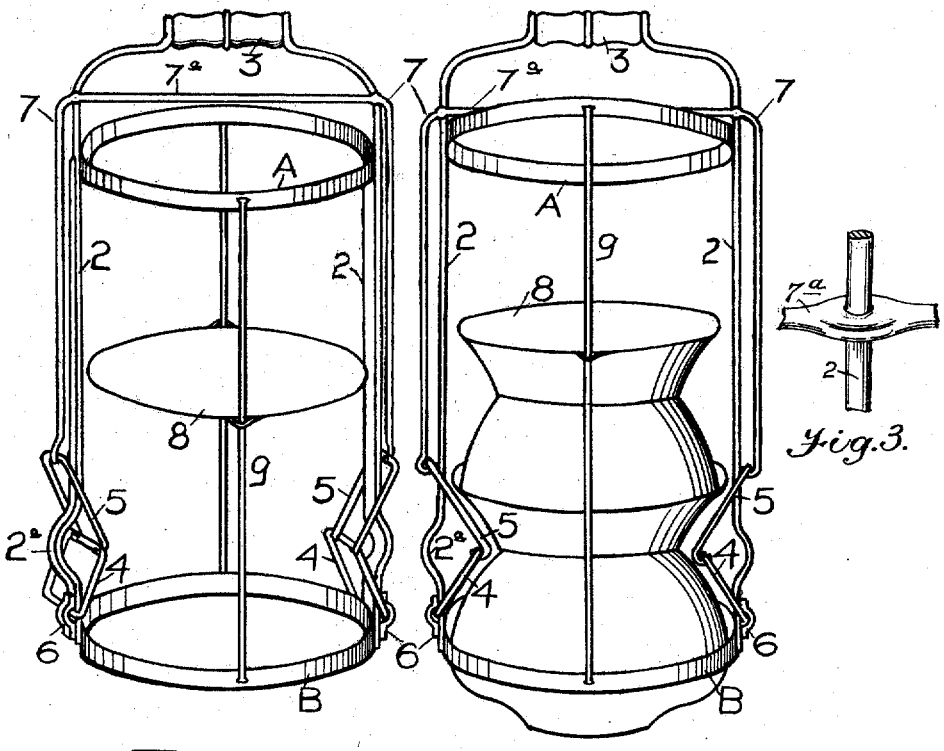

No. 12,258. REISSUED AUG. 16, 1904.

J. P. JOHNSON.

CUSPIDOR COLLECTOR AND CARRIER.

APPLICATION FILED MAR. 1, 1904.

WITNESSES:

C. B. McAuley

J. H. Louise

INVENTOR

John P. Johnson

BY

Geo. H. Strong

ATTORNEY

No. 12,258. Reissued August 16, 1904.

UNITED STATES PATENT OFFICE.

JOHN P. JOHNSON, OF SONORA, CALIFORNIA.

CUSPIDOR COLLECTOR AND CARRIER.

SPECIFICATION forming part of Reissued Letters Patent No. 12,258, dated August 16, 1904.

Original No. 726,539, dated April 28, 1903. Application for reissue filed March 1, 1904. Serial No. 196,116.

*To all whom it may concern:*

Be it known that I, JOHN P. JOHNSON, a citizen of the United States, residing at Sonora, county of Tuolumne, State of California, have invented an Improvement in Cuspidor Collectors and Carriers; and I hereby declare the following to be a full, clear, and exact description of the same.

My invention relates to a device for carrying cuspidors or vessels of any description where it is desirable to carry a number at once.

It consists of a frame of sufficient diameter to receive the articles to be carried, a slidable yoke guided and movable with relation to the vertical portion of the frame, and jointed links or equivalent grippers which are adapted to move inward, so as to form supports for the articles to be carried. These arms are raised and disengaged by lifting the yoke, and when the yoke is released they fold or move inwardly, so as to engage the bottom or other part of the device to be carried and hold it in place.

Referring to the accompanying drawings for a more complete explanation of my invention, Figure 1 is a perspective view of my invention open in readiness to pick up a cuspidor. Fig. 2 is a front elevation of same closed with cuspidors in position. Fig. 3 is a detail showing one form of guide for the rods 7.

It is the object of my invention to provide a convenient means for carrying cuspidors or other articles which can be superposed one upon the other, so that a large number can be picked up successively without handling, carried to any point of deposit, and one or more may be deposited at any point desired.

I have in the present drawings illustrated my invention as applicable to the carrying of cuspidors; but it will be obvious that it can be easily adapted to convey any articles having a shape which will enable the links to engage and hold the articles.

As herein shown, A and B are top and bottom annular rings, which are connected by the vertical side bars 2, and a handle 3 serves to lift the whole device. The diameter of the lowermost ring is sufficient to admit the cuspidor or other article from below, so that when the device is set down over a cuspidor standing upon the floor the bottom ring will rest upon the floor and the cuspidor will be contained within the frame.

In order to engage and hold the cuspidor, I have shown the links 4 and 5, the link 4 being pivoted and turnable in sleeves or channels 6 on the lower part of the side frame 2. The link 5 is somewhat longer than the link 4 and is loosely connected with the link, so that they are movable with relation to each other. The outer ends of the links 5 are loosely connected with the lower ends of rods 7, which are guided and slidable with relation to the vertical side frames 2. They may be guided in any suitable manner. As here shown, the transverse top portion $7^a$, which connects the two rods 7, is flattened and has holes made in it slidable upon the vertical handle portion, which serve as guides. This transverse portion $7^a$ is located just below the handle 3, and when the device is empty, if it is desired to pick up a number of cuspidors, the person holding the handle will reach down with the finger and pull up on the transverse bar and the side bars 7, which straighten out and separate the links, causing the meeting ends of the links to drop into a space formed in the side bars 2 by slightly curving them outward, as at $2^a$; but it will be manifest that if they are wide enough apart this may be omitted or other equivalent construction made, the object being in any construction to straighten or separate the links or grips to allow them to pass the projecting side of the cuspidor or other article. As soon as they have passed the widest portion of cuspidor by releasing the transverse bar $7^a$ the links will immediately fall into their normal position, inclining inwardly, so that they will grasp the projecting upper edge of the cuspidor. When the next one is reached, by seating the bottom of the one already in the holder upon the top of the next one it will push the first one up, and the links will in the same manner as above described pass below the second one and engage with it, and so on for as many as the device will hold.

It will be manifest that the connection of the grips may be such that they will slip over the article to be picked up without pulling up on the handle 7[a] and will engage the lowermost of any number of articles which can be carried in the holder, and when it is desired to release one or more it is only necessary to pull up on the bar 7[a] to straighten out and separate the links or arms. Then by raising the device one, two, or more may be deposited at any point. In this manner all the cuspidors of a large building or offices may be readily collected without handling and taken to a place where they are to be cleaned. After being cleaned they can in the same manner be carried to the point of use and deposited one or more at a time wherever desired.

8 is a cover of sufficient size to fit over the top of any article which may be picked up by this apparatus. The cover has perforated lugs at opposite sides, and these are slidable upon guide-rods, either the vertical side bars 2 of the frame or they may be independent rods, as at 9.

When the device is empty, the cover will slide down upon its guides to the bottom of the frame, and as each article is picked up by the device the cover rests upon the top of that article until when the device is filled the cover rests upon the uppermost, while each of the other ones forms a cover for the one beneath.

Having thus described my invention, what I claim, and desire to secure by Letters Patent, is—

1. A device for holding cuspidors and like articles consisting of an open-bottomed frame, links connected and adapted to fold inwardly with relation to the frame, and a means for raising the links into position to pass over the edges of the articles to be collected.

2. A device for collecting and carrying cuspidors and the like consisting of an open-bottomed frame, vertical side bars and a handle at the top, links having their meeting ends loosely connected, the lowermost links being fulcrumed to the lower part of the frame, vertically guided and movable side rods with which the upper ends of the upper links are connected whereby they may be raised into an approximately straight line to admit or release the cuspidors, said links dropping and folding inwardly by gravitation to engage and retain the cuspidors in position.

3. A device for collecting, carrying and distributing cuspidors and the like, consisting of an open-bottomed frame within which the articles may pass, links loosely fulcrumed and adapted to move inwardly and engage the edges of the articles, a handle and connections between it and the links whereby the latter may be raised to disengage them from the edges of the articles and allow them to be deposited successively.

4. A device for collecting, carrying and depositing cuspidors and the like, consisting of an open-bottomed frame, links fulcrumed near the bottom of the frame, connected together and adapted to fold inwardly to engage the edges of the article, a handle and connections by which the links may be straightened to release one or more of the articles and allow it to be deposited, a cover and guides upon the frame upon which said cover is slidable so that it rests upon the top of the uppermost of the articles.

5. A device for holding or releasing cuspidors and the like, said device consisting of an open-bottomed frame, foldable grippers upon opposite sides of said frame, and means by which said arms are caused to approach or recede from each other.

6. A device for holding and releasing cuspidors and the like, consisting of an open-bottomed frame, rods vertically slidable with relation to said frame, and jointed grippers connected with the rods and movable thereby to clasp or release the articles.

7. A cuspidor-carrier comprising a frame open at the bottom, grippers normally protruded into the path of the spittoon to be carried and means for operating the grippers to release the article.

8. A cuspidor-carrier comprising an open-bottom frame, inwardly-protruding gravity-actuated grippers on said frame, and means for retracting the grippers to allow a cuspidor to pass said grippers.

9. A cuspidor-carrier comprising an open-bottom frame, grippers arranged normally to protrude inwardly to engage the cuspidor, and means for retracting the grippers to release the article.

10. A cuspidor-carrier comprising an open-bottom frame, a handle therefor, inwardly-foldable grippers on the frame, and means associated with the handle to retract the grippers.

11. A cuspidor-carrier comprising an open-bottom frame, a handle therefor, grippers arranged to project normally by gravity into the interior of said frame to grasp a cuspidor, and means associated with the handle to retract the grippers to release the cuspidor.

In witness whereof I have hereunto set my hand.

JOHN P. JOHNSON.

Witnesses:
FONDA M. CRANE,
FRANK R. BRANCH.